US010977870B2

(12) United States Patent
Michel et al.

(10) Patent No.: US 10,977,870 B2
(45) Date of Patent: Apr. 13, 2021

(54) VIEWING DEVICE FOR AIRCRAFT PILOT

(71) Applicant: SAFRAN ELECTRONICS & DEFENSE, Boulogne-Billancourt (FR)

(72) Inventors: Franck Michel, Boulogne-Billancourt (FR); Sébastien Lecuyer, Boulogne-Billancourt (FR); Maurice Sauvain, Boulogne-Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 16/765,952

(22) PCT Filed: Nov. 28, 2018

(86) PCT No.: PCT/EP2018/082895
§ 371 (c)(1),
(2) Date: May 21, 2020

(87) PCT Pub. No.: WO2019/106046
PCT Pub. Date: Jun. 6, 2019

(65) Prior Publication Data
US 2020/0357179 A1    Nov. 12, 2020

(30) Foreign Application Priority Data

Nov. 30, 2017  (FR) .................................. 1701259

(51) Int. Cl.
*G06T 19/00* (2011.01)
*B64D 43/00* (2006.01)
*G02B 27/01* (2006.01)

(52) U.S. Cl.
CPC ............ *G06T 19/006* (2013.01); *B64D 43/00* (2013.01); *G02B 27/0172* (2013.01);
(Continued)

(58) Field of Classification Search
CPC .... G06T 19/006; G02B 27/0179; B64D 43/00
See application file for complete search history.

(56) References Cited

U.S. PATENT DOCUMENTS

| 7,180,476 B1 | 2/2007 | Guell et al. |
| 9,785,231 B1 | 10/2017 | Zimmerman et al. |

(Continued)

FOREIGN PATENT DOCUMENTS

| EP | 2 469 869 A1 | 6/2012 |
| FR | 2 659 934 A2 | 9/1991 |
| WO | WO-2017/115365 A1 | 7/2017 |

OTHER PUBLICATIONS

Kim, Sang-Hwan, "Multidimensional Measure of Display Clutter and Pilot Performance for Advanced Head-up Display", "Aviation, space, and environmental medicine", 2011, vol. 82 11, pp. 1013-1022 (Year: 2011).*

*Primary Examiner* — Terrell M Robinson
(74) *Attorney, Agent, or Firm* — Muncy, Geissler, Olds & Lowe, P.C.

(57) ABSTRACT

A viewing device for an aircraft pilot, the device comprising: a support for positioning on the head of the aircraft pilot; a display surface; display means carried by the support and arranged to display augmented reality objects on the display surface; acquisition means arranged to act in real time to acquire first data representative of the position and of the orientation of the support, second data representative of the position and of the orientation of a cockpit of the aircraft, and third data defining congested zones occupied by equipment of the cockpit, and to acquire the augmented reality objects; and processor means arranged to act in real time to define positions for the augmented reality objects, so that all of the augmented reality objects are positioned outside the congested zones when they are displayed on the display surface.

9 Claims, 2 Drawing Sheets

(52) U.S. Cl.
CPC .... *G02B 27/0179* (2013.01); *G02B 2027/014* (2013.01); *G02B 2027/0138* (2013.01); *G02B 2027/0141* (2013.01); *G02B 2027/0187* (2013.01)

(56) References Cited

U.S. PATENT DOCUMENTS

| | | | |
|---|---|---|---|
| 10,382,746 B1* | 8/2019 | Shapiro | G06T 7/0075 |
| 2015/0239574 A1* | 8/2015 | Ball | B64D 45/00 |
| | | | 701/3 |
| 2016/0232717 A1 | 8/2016 | Wong et al. | |
| 2017/0032576 A1* | 2/2017 | Mazoyer | B64D 43/00 |
| 2017/0069136 A1 | 3/2017 | Sharma | |
| 2018/0081181 A1* | 3/2018 | Lambert | G02B 27/0189 |
| 2018/0251230 A1* | 9/2018 | Chavez | B64C 13/042 |
| 2019/0025905 A1* | 1/2019 | Godina | G05B 17/00 |

* cited by examiner

VIEWING DEVICE FOR AIRCRAFT PILOT

BACKGROUND OF THE INVENTION

The use of so-called "augmented reality" technology is tending to become more widespread in modern aircraft, and in particular in fighters.

Augmented reality makes it possible to incorporate augmented reality objects in the real environment visible to the pilot so that such augmented reality objects are accessible to the pilot without any need to look in another direction.

Augmented reality objects comprise in particular images or written information.

By way of example, the images may be images of a landing strip, of ground topography (mountains, valleys, etc.), of the sea, of any kind of target, of various vehicles including other aircraft, of various buildings, etc. By way of example, the written information may be about a current mission, about monitoring various parameters of the fighter, about a message sent to the pilot, etc.

Augmented reality also makes it possible to compensate for the effects of reduced visibility.

Reduced visibility may be due to night flying conditions or to poor weather conditions.

Reduced visibility may also be due to the position of the pilot in the cockpit of the fighter.

With reference to FIG. 1, it is known that in a fighter 1, the visibility of the pilot 2 is relatively reduced as a result of the constraints involved in installing the pilot 2 in the cockpit 3.

In the fighter 1, the pilot 2 is strapped to an ejector seat 4. The pilot's helmet 5 is held up by the headrest 6 of the ejector seat 4. Typically, the pilot 2 can tilt the helmet 5 forwards through only 15°, can turn it to the left or to right through only 80°, and can incline it sideways through only 45°. Furthermore, the pilot's eyes can swivel through about 30° upwards, downwards, to the left, and to the right. The pilot 2 can perceive shapes and symbols in a zone limited to ±20° about a viewpoint.

By steering the pilot's viewpoint directly to sensitive points of interest, e.g. to a target, to a landing strip, to another airplane, augmented reality makes it possible to compensate for such reduced visibility.

OBJECT OF THE INVENTION

An object of the invention is to improve the assistance provided to an aircraft pilot by a viewing device making use of augmented reality technology.

SUMMARY OF THE INVENTION

In order to achieve this object, there is provided a viewing device for an aircraft pilot, the device comprising:
- a support for positioning on the head of the aircraft pilot;
- a display surface carried by the support and for positioning in the proximity of an facing the eyes of the aircraft pilot;
- display means carried by the support and arranged to display augmented reality objects on the display surface;
- acquisition means arranged to act in real time to acquire first data representative of the position and of the orientation of the support, second data representative of the position and of the orientation of a cockpit of the aircraft, and third data defining congested zones occupied by equipment of the cockpit, and also to acquire the augmented reality objects; and
- processor means arranged to act in real time to define positions and/or orientations and/or shapes and/or sizes for the augmented reality objects by making use in particular of the first data, of the second data, and of the third data, so that all of the augmented reality objects are positioned outside the congested zones when they are displayed on the display surface.

The viewing device of the invention thus makes it possible to ensure that the augmented reality objects are not superposed on cockpit equipment while they are being displayed.

The cockpit equipment includes equipment for providing the pilot with visual information. Thus, displaying the augmented reality objects does not affect the availability of that visual information.

The viewing device of the invention thus improves the assistance given to the pilot.

There is also provided an aircraft pilot helmet including a visor and a viewing device as described above, the display surface being situated on the visor.

There are also provided eyeglasses including lenses and a viewing device as described above, the display surface being situated on the lenses.

There is also provided an augmented reality mask comprising a screen and a viewing device as described above, the display surface being situated on the screen.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
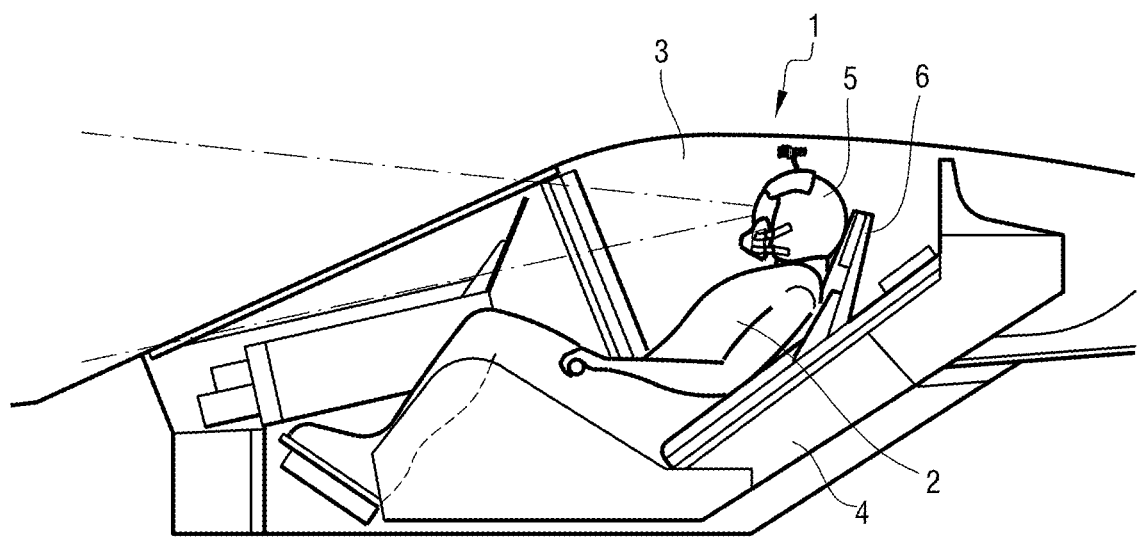
FIG. 1 shows a pilot sitting in a cockpit of a fighter.
Figure 2:
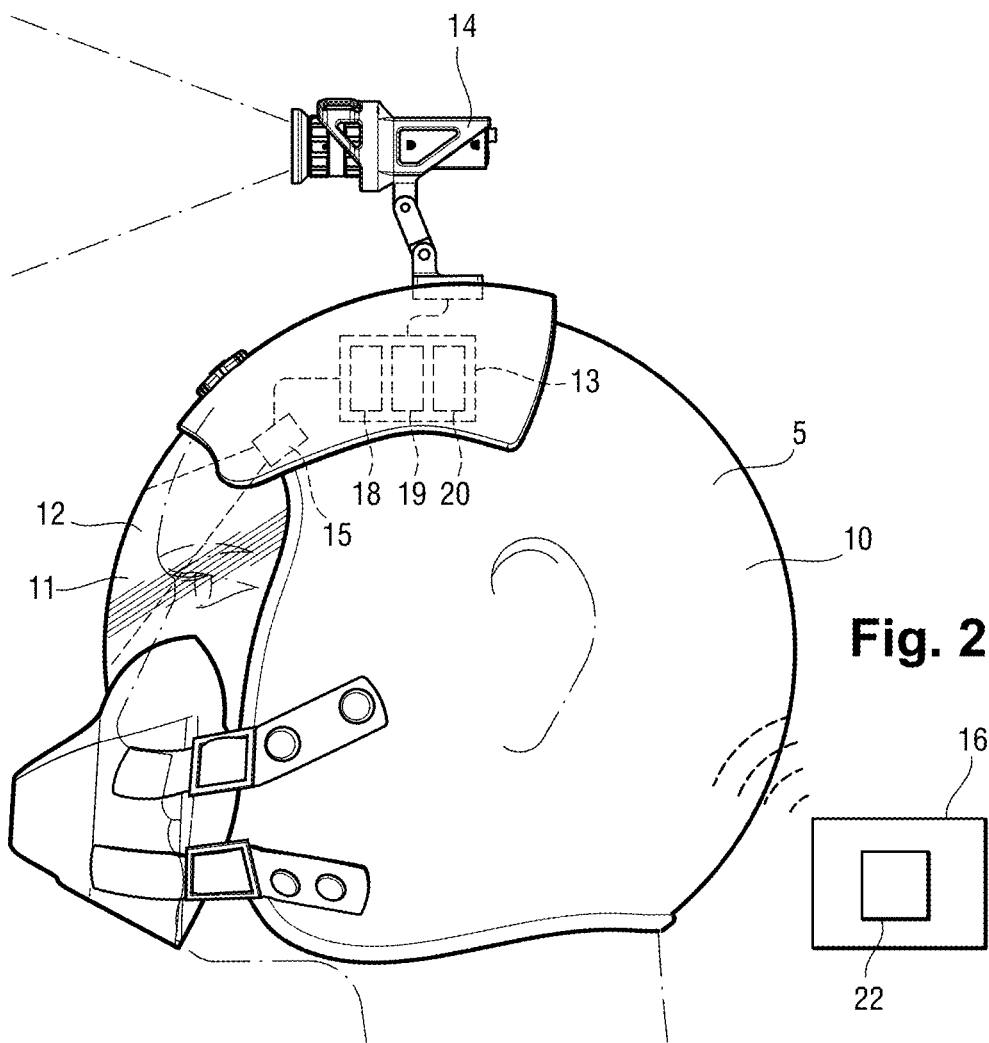
FIG. 2 shows a fighter pilot helmet having a viewing device of the invention incorporated therein.

With reference to FIG. 2, the viewing device of the invention for an aircraft pilot in this example is incorporated in an aircraft pilot helmet 5 comprising a shell 10 and a visor 11.

The term "pilot" is used herein to mean not only the pilot actually in charge of piloting the aircraft, but also any other person (e.g. a co-pilot or a navigator) who could be in the cockpit when the aircraft is in flight.

In this example, the aircraft is a fighter.

The shell 10 of the helmet 5, which is for placing on the pilot's head in order to protect it, forms a support for the viewing device.

The viewing device also includes a display surface 12 carried by the shell 10 for positioning in the proximity of and facing the pilot's eyes. In this example, the display surface 12 is the inside surface of the visor 11.

The viewing device also includes a first package 13, a camera 14, display means 15, and a second package 16.

The first package 13 is positioned on the shell 10 of the helmet 5.

The term "package" is used herein to cover not only a package (or casing) as such, but also one or more circuit boards carrying electronic components and situated in the package, together with means for fastening or incorporating the package in its environment.

The first package 13 comprises acquisition means 18, processor means 19, and first measurement means 20.

The acquisition means 18 and the processor means 19 are software elements and/or hardware elements included in part or in full in one or more processor components, and they may be nested in one another. By way of example, the processor component(s) may comprise a microcontroller, an application-specific integrated circuit (ASIC), a field programmable gate array (FPGA), a digital signal processor (DSP), or a processor.

The first measurement means 20 comprise a first inertial unit and first sensors.

The first measurement means 20 produce first data representative in particular of the position and the orientation of the helmet 5 and of its shell 10. The first data is also representative of the pilot's viewpoint. The first inertial unit is arranged to contribute to producing the first data (specifically the position and the orientation of the helmet 5).

The camera 14 produces an audio/video stream that is the image of the pilot's real visible environment and real sound environment. The camera 14 is connected to the first package 13 via any kind of wired or wireless communication means.

The display means 15 are carried by the shell 10 and they are positioned facing the display surface 12. The display means are arranged to display augmented reality objects on the display surface 12.

By way of example, the augmented reality objects comprise images or written information. The augmented reality objects are either produced before a mission of the fighter and stored in a memory, or else they are produced dynamically, e.g. as a function of information supplied by instruments on board the fighter.

By way of example, the images may be images of a landing strip, of ground topography (mountains, valleys, etc.), of the sea, of any kind of target, of various vehicles including other aircraft, of various buildings, etc. By way of example, the written information may be about a current mission, about monitoring various parameters of the fighter, about a message sent to the pilot, etc.

In this example, the display means 15 comprise a projector that projects the augmented reality objects onto the display surface 12 so that they are superposed on the pilot's real visible environment.

The second package 16 is positioned in the cockpit.

The second package 16 comprises a second measurement means 22.

The second measurement means 22 include a second inertial unit and a global positioning system (GPS) receiver.

The second measurement means 22 produce second data representative in particular of the geographical position and the orientation in three dimensions of the fighter, and of the speed and of the direction of flight of the fighter (and thus of the cockpit). The second inertial unit is arranged to contribute to producing the second data (specifically the orientation of the cockpit).

The second package 16 is connected to the first package 13 via any kind of wired or wireless second communication means.

There follows a more detailed description of the operation of the viewing device of the invention.

The purpose of the viewing device is to display augmented reality objects on the display surface 12, without them being superposed on the equipment of the cockpit when they are seen by the pilot.

Figure 3:
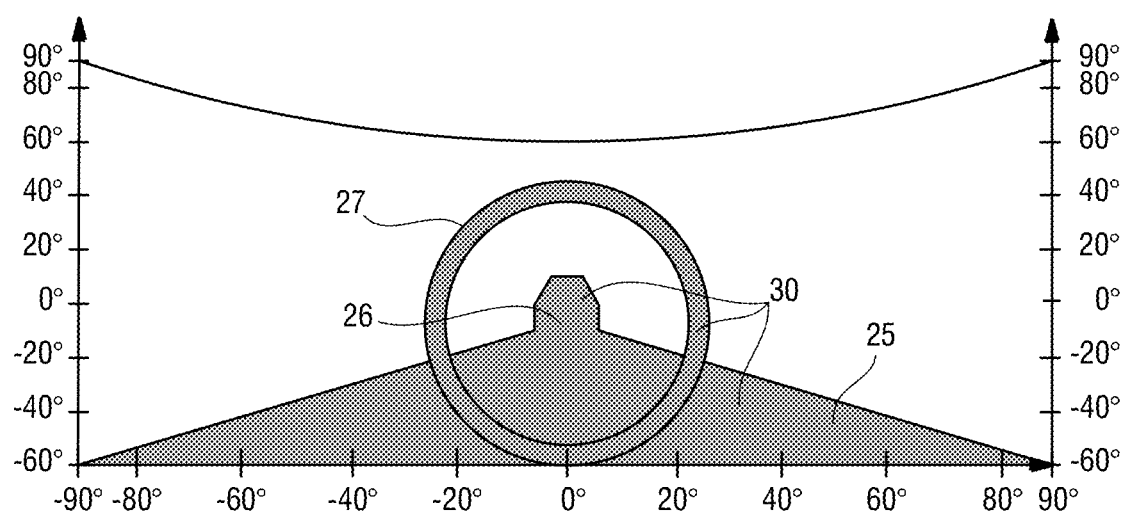
FIG. 3 shows a field of view of a fighter pilot.

With reference to FIG. 3, in this example the cockpit equipment comprises flight instruments 25, a head-up display mirror 26, and structural elements of the cockpit.

The structural elements of the cockpit comprise a canopy arch 27 carrying one or more rear-view mirrors.

The acquisition means 18 of the first package 13 are arranged to acquire the first data and the second data in real time. The acquisition means 18 also acquire third data defining congested zones 30 that are occupied by the cockpit equipment.

The congested zones 30 thus correspond to surfaces that are occupied by the cockpit equipment.

The third data may be stored in a memory of the first package 13 or of the second package 16, and may be generated prior to the viewing device being put into service.

The third data may also include a three-dimensional representation of the cockpit and of the cockpit equipment.

The three-dimensional representation may be obtained by modelling a cockpit design corresponding to the cockpit of the fighter. The three-dimensional representation may also be obtained, when initializing the viewing device, by processing images produced by the camera 14 of the viewing device (or indeed images produced by another camera situated in the cockpit).

The third data may also include an image representing outlines corresponding to the congested zones 30.

Under such circumstances, the acquisition performed by the acquisition means 18 corresponds to recovering the third data stored in a memory.

The third data may also be acquired dynamically by the acquisition means 18.

By way of example, the dynamic acquisition may make use of markers having positions that serve to define the congested zones 30. The markers may be elements added to the cockpit equipment (e.g. labels stuck on the cockpit equipment), or they may be the geometrical shapes of the structure of the cockpit equipment (e.g. a corner, a line, a right angle, etc.). The markers are recognized in real time and they serve, in real time, to define the congested zones 30.

Dynamic acquisition may also be performed by image processing, using images produced by the camera 14 of the viewing device. By using these images, the cockpit equipment is recognized in real time and the congested zones 30 are defined in real time. The camera 14 is thus arranged to contribute to producing the third data.

The acquisition means 18 also acquire the augmented reality objects.

Thereafter, the processor means 19 of the viewing device are arranged to act in real time to define positions and/or orientations and/or shapes and/or sizes for the augmented reality objects, in particular by making use of the first data, of the second data, and of the third data.

The processor means 19 analyze the first data, the second data, and the third data in real time to recreate in three dimensions the pilot's real visible environment, and to incorporate the augmented reality objects in that real visible environment.

The augmented reality objects are incorporated in such a manner that the augmented reality objects are easily visible for the pilot when the augmented reality objects are projected on the display surface 12.

The augmented reality objects are also incorporated in such a manner that they are positioned outside the congested zones 30 when they are projected on the display surface 12.

Thus, displaying the augmented reality objects does not, at any time, mask the cockpit equipment, in full or in part.

Advantageously, the viewing device may be deactivated at any time by performing a deactivation action that is detected by the viewing device.

The deactivation action may be a gesture, e.g. detected by using the camera 14 of the viewing device, or a spoken command detected by using the microphone of the viewing device.

After being deactivated, the viewing device can also be reactivated at any time by performing a reactivation action that is detected by the viewing device. The reactivation action may optionally be similar to the deactivation action.

A self-test of the viewing device may also be launched at any time by performing a self-test action. As above, the self-test action may be a gesture or a spoken command. A self-test may serve in particular to force the congested zones 30 as defined by the third data to be realigned on the real cockpit equipment. The self-test may also display the congested zones 30 so that the pilot can personally verify that they are indeed aligned with the real cockpit equipment.

Naturally, the invention is not limited to the embodiment described, but covers any variant coming within the ambit of the invention as defined by the claims.

The above description relates to a viewing device incorporated in a helmet. The viewing device could equally well be incorporated in other equipment, e.g. in eyeglasses or in an augmented reality mask.

With eyeglasses, the display surface is situated on the lenses. The term "lens" is used to mean a transparent element of generally flat shape through which the pilot can see the real visible environment. The support comprises the frame or the structure of the eyeglasses. With eyeglasses, as with the helmet and its visor, the augmented reality objects are projected onto the lenses and become superposed on the real visible environment as seen directly by the pilot.

With an augmented reality mask, the display surface is situated on a screen positioned facing the pilot's eyes. The augmented reality objects are then displayed by being displayed on a screen, and not by being projected by means of a projector. The support comprises the structure of the augmented reality mask. With the mask, the real visible environment is filmed and displayed in real time on the screen, and is thus seen by the pilot via its display on the screen and not directly (the pilot's direct vision is masked by the screen). The augmented reality objects are incorporated in the real visible environment as displayed on the screen.

Certain kinds of cockpit equipment are mentioned above, however account may be taken of other kinds of cockpit equipment, e.g. a co-pilot seat or some other structural elements of the cockpit.

The architecture of the viewing device may be different. The first package and the second package could both be situated on the support of the viewing device, or they could be combined to form a single package. The first package could also be positioned in the cockpit instead of being carried by the support.

The invention claimed is:

1. A viewing device for an aircraft pilot, the viewing device comprising:
   a support for positioning on a head of the aircraft pilot;
   a display surface carried by the support and for positioning in a proximity of and facing eyes of the aircraft pilot;
   display means carried by the support and arranged to display augmented reality objects on the display surface;
   acquisition means arranged to act in real time to acquire first data representative of a position and of the orientation of the support, second data representative of the a position and of the orientation of a cockpit of the aircraft, and third data defining congested zones occupied by equipment of the cockpit, and also to acquire the augmented reality objects; and
   processor means arranged to act in real time to define positions and/or orientations and/or shapes and/or sizes for the augmented reality objects by making use in particular of the first data, of the second data, and of the third data, so that all of the augmented reality objects are positioned outside the congested zones but remaining in a field of view of the aircraft pilot when they are displayed on the display surface.

2. The viewing device according to claim 1, wherein the cockpit equipment comprises flight instruments and/or a head-up display mirror and/or a structural element of the cockpit.

3. The viewing device according to claim 2, wherein the structural element of the cockpit comprises a canopy arch provided with a rear-view mirror.

4. The viewing device according to claim 1, including a first inertial unit carried by the support and arranged to contribute to producing the first data.

5. The viewing device according to claim 1, including a second inertial unit arranged to contribute to producing the second data.

6. The viewing device according to claim 1, including a camera carried by the support and arranged to contribute to producing the third data.

7. An aircraft pilot helmet including a visor and a viewing device according to claim 1, the display surface being situated on the visor.

8. Eyeglasses including lenses and a viewing device according to claim 1, the display surface being situated on the lenses.

9. An augmented reality mask comprising a screen and a viewing device according to claim 1, the display surface being situated on the screen.

* * * * *